United States Patent [19]
Whelan

[11] 3,753,727
[45] Aug. 21, 1973

[54] METHOD OF RESTRUCTURING RICE
[75] Inventor: John C. Whelan, Woodland, Calif.
[73] Assignee: Adams & Whelan, Woodland, Calif.
[22] Filed: Dec. 28, 1970
[21] Appl. No.: 102,077

[52] U.S. Cl............................. 99/81, 99/2, 99/81
[51] Int. Cl............................. A23l 1/10, A23l 1/18
[58] Field of Search................. 99/80 R, 81, 80 PS, 99/82

[56] References Cited
FOREIGN PATENTS OR APPLICATIONS
500,706   3/1954   Canada................................. 99/81

Primary Examiner—Raymond N. Jones
Attorney—Lothrop & West

[57] ABSTRACT

Rice is restructured by quickly heating a mass of natural rice at substantially atmospheric pressure to a temperature of about 300° F and then passing the rice mass while so heated between rotating rolls, preferably metal, and yieldably pressed together, so that the heated rice is mechanically squeezed and then is discharged, preferably by gravity, whereupon the rice grains enlarge in all dimensions.

9 Claims, No Drawings

METHOD OF RESTRUCTURING RICE

In the handling of rice it is sometimes advantageous to alter the rice grains in some fashion so that they can easily be recognized as distinct from other naturally occurring and untreated rice grains. Sometimes this is attempted by dyes, superficial coloring matter of various sorts and the like. In most instances colors or dyes are disadvantageous for many reasons, either because they are readily removed or are not sufficiently distinct or may, in some instances, result in adverse reactions. It is also often desired to change the cellular constituency of rice in order to make it more readily acceptable for feeding, either human or animal, and sometimes also for the purpose of altering its available nutritional value. It is likewise sometimes advantageous to change the bulk of the rice so that it is greater than that of natural rice for various different commerical purposes.

Heretofore it has been the custom to heat rice with normal or extra moisture and at a substantially elevated pressure, so that the rice is simultaneously subject to heating and pressurizing. Thereupon the pressure is quite suddenly relieved. As a result the rice puffs or enlarges substantially. This is an effective way of changing the appearance and the structure of the rice, but it is likewise not only a relatively expensive process because of the necessary pressure vessels but also tends to be feasible only in a batch process rather than in a continuous process.

It is therefore an object of the invention to provide an improved method of restructuring rice.

A further object of the invention is to provide a method of restructuring rice not involving heavy pressure vessels.

A further object of the invention is to provide a method of restructuring rice which readily lends itself to a continuous type of operation.

A further object of the invention is to provide a method of restructuring rice which can readily be accomplished without any heavy or special equipment and can readily be carried out in most milling or feed handling establishments with only minor variations in or rearrangement of the machinery.

A further object of the invention is to provide a method of restructuring rice in which the controls necessary for consistent operation are exceedingly simple and straightforward.

A further object of the invention is in general to provide an improved method of restructuring rice.

In the conduct of the present method, the starting material is referred to as natural rice. By this is meant a rice grain as it naturally occurs and as it has been removed from the rest of the rice plant. It may or may not have been treated to remove the hull. The rice grain may or may not be polished. In any event, it is received in an uncooked or previously untreated condition except for the possible hull removal and possible polishing. While there may be some other locally unusual grains that act similarly to rice under the practice of this process and so can be considered as equivalents to rice, the usual, other commercial grains, such as corn, oats, wheat and barley, have not responded to the practice of the present process, do not develop the same or a similar restructuring under this process and so are not herein considered as equivalent to rice.

To carry out the process, a mass of natural rice grains is assembled in a suitable container at atmospheric pressure and under ambient atmospheric conditions as to humidity and temperature and then is subject to a heating step. Heat is applied quickly to the assembled mass of rice grains, so that they are promptly raised in temperature from the normal ambient temperature to a temperature value in excess of the atmospheric boiling point of water and preferably in the neighborhood of 300° F. Reference to quickly heating the rice mass means that each rice grain is subject to hot air and is brought up through the temperature gradient in a matter of 2 minutes.

When heated in this fashion, the resulting appearance of the mass of grain so heated is not appreciably different from the initial visual appearance of the mass of starting material. But if the heating is done relatively slowly, the rice tends to lose its moisture; that is, to dry out and shrink or distort and likewise to change its color by darkening. Also, some of the grains, particularly if there is a very small mass of grains involved, may tend to enlarge slightly. If a substantial quantity or mass of grains is processed quickly, then the color during the quick heating does not appreciably change nor do any of the grains appreciably change their shape or volume.

In accordance with the process, the mass of rice quickly heated to approximately 300° F is immediately passed while warm between the abutting surfaces of a pair of rollers. These are the customary parallel, metal rollers normally smooth and circular cylindrical. They are not initially heated but after some use become heated to approximately the same temperature as the passing rice. The rollers are mounted in such a fashion that they can yield with respect to each other. While they may abut initially they yield against spring pressure as rice quantities pass between them. AS an example, rolls approximately 16 inches in diameter and 18 inches long are pressed together with springs exerting a total force of approximately 2,000 pounds. The force per inch of roll length is about 110 pounds. The mass of heated rice is fed, preferably by gravity, between the generally horizontal rolls from the upper, converging sides thereof and passes down between the rolls to discharge by gravity. The rolls, of course, yield as the mass of rice passing between them varies slightly in bulk but the unit pressure is always substantially the same. Some warm air is entrained by the rice flow.

It might be expected that this amount of force on the heated rice would tend permanently to flatten and crush the rice grains and result in a product resembling flakes or plates. This is not the case. The rice grains in passing between the rolls are momentarily flattened or deformed, but as they emerge on the downstream or discharge side of the rolls and fall by gravity they immediately enlarge into a volume substantially greater than the initial volume. This in effect is a puffing of the rice grains. The appearance of the rice grains and of the rice mass on the downstream side of the rolls is entirely different from that on the upstream side of the rolls. The treated rice is readily distinguished by appearance from untreated rice. Furthermore, the product has the attributes of a rice grain that has been substantially restructured.

What is believed to occur is that during the quick heating of the natural rice grains the moisture within the cells is brought above its boiling point and would form steam except for the fact that the cell walls are intact and retain the hot moisture in place under internal cell pressure. In passing through the rolls, the cell wall structure is substantially reoriented and in many places mechanically interrupted or broken. The pressure within the cells resulting from the initial heating is rather abruptly released into adjacent grain volumes, enlarging the grains. The moisture within the cells is such as to render their walls fairly spongy or resilient or plastic, so that no permanent crushing occurs as the rice grains go between the rolls, yet as soon as the roll pressure is relieved the internal pressure due to the heated moisture is sufficient to move the disrupted cells and to travel to others and thus distort or enlarge the volume of the so-treated rice.

As it emerges from the rolls on the discharge side, the rice falls by gravity and is simply collected and permitted to cool to ambient or atmospheric value. The mass of treated rice is then removed from the structure and is ready for subsequent operations.

As described, it will be appreciated that the process can be operated virtually as a batch process in that a definite, small quantity of rice can be put through at any one time. It will also be appreciated that rice going through the heating zone and through the subsequent rolling zone to the discharge zone can likewise continue uninterruptedly for an indefinite period, and thus may be a continuous process.

As an example of what occurs under the conditions mentioned, a representative batch of natural rice going into tthe process but being merely heated therein has a mean or representative grain of a length of 5.62 millimeters, a width of 2.77 millimeters and a thickness of 2.03 millimeters. The same representative or mean grain sample at the discharge side of the process, after passing between the rolls, shows a length of 8.26 millimeters, a width of 4.70 millimeters and a thickness of 3.10 millimeters. This amounts to an increase of 47 per cent in length, of 70 per cent in width and of 53 per cent in thickness. Thus, simply as a distinguishing or marking arrangement, the process presents a product which is markedly different in appearance becasue of its increased size. Furthermore, the exterior surface of the rice is somewhat irregular and the normal rice grain shape is substantially distorted. Also, the internal, cellular structure of the rice is mechanically altered substantially to attain the benefits, such as better nutrient availabiliy, accompanying grain puffing.

The regulation of the process is extremely simple in that the only factor of consequence is to maintain the quick heating during a time of about 2 minutes and at a value of approximately 300° F. This time and this value are not absolutely critical, but something in the immediate range is satisfactory and can readily be controlled by ordinary commerical equipment. The pressure on the rolls is a matter of initial machine design, and once it has been established and set usually requires no regulation, adjustment or supervision. Thus the process can be carried out, once started, with no supervision whatsoever and under fully automatic control.

What is claimed is:

1. A method of restructuring rice consisting essentially in the steps of quickly heating natural uncooked rice from its natural ambient temperature and substantially at atmospheric pressure to a temperature above the atmospheric boiling point of water, then mechanically deforming said rice while at said temperature by subjecting said rice to a predetermined compressive force, then promptly relieving said rice from said force whereby said rice immediately enlarges into a volume substantially greater than the initial volume, and collecting said deformed rice at substantially atmospheric pressure.

2. A method as in claim 1 in which the heating period of said rice is about 2 minutes.

3. A method as in claim 1 in which the heating temperature of said rice is about 300° F.

4. A method as in claim 1 in which said rice is subject only momentarily to said force.

5. A method as in claim 1 in which said force is equivalent to that exerted on said rice in passing between cylindrical rolls yieldingly urged together with a pressure of about 110 pounds per axial inch of roll length.

6. A method as in claim 1 in which said deforming step quickly follows the attainment of the temperature above the atmospheric boiling point of water in said heating step.

7. A method as in claim 1 in which said heating step is performed by air.

8. A method as in claim 1 in which said rice advances in a continuous stream while being heated, then while being subjected to said force, and then while said rice is being relieved of said force.

9. A method as in claim 8 in which said rice advances largely by gravity.

* * * * *